Sept. 2, 1930.　　　R. H. REITER　　　1,774,814
LIQUID LEVEL OPERATED RHEOSTAT
Filed April 7, 1924　　　2 Sheets-Sheet 1
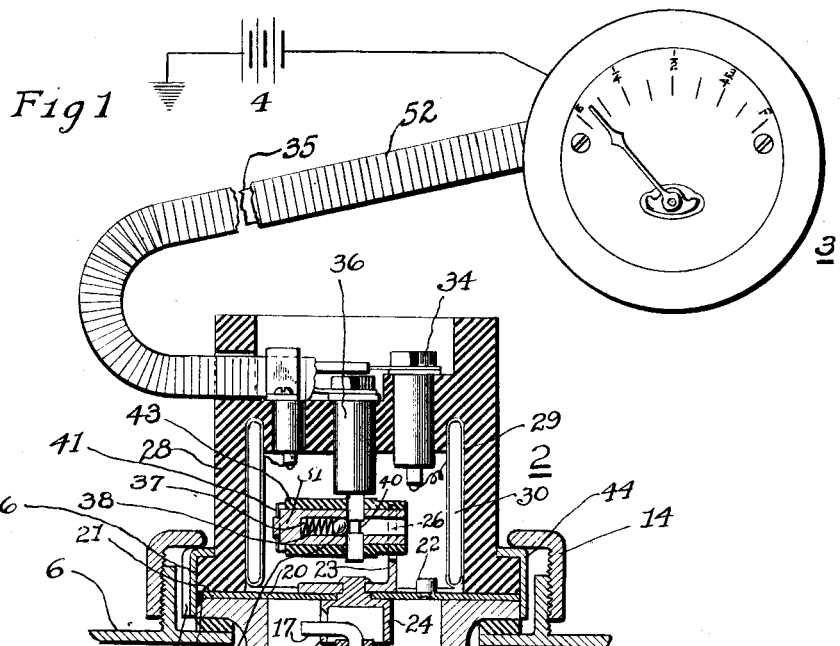
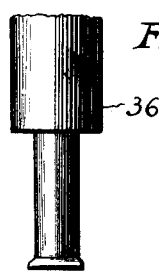
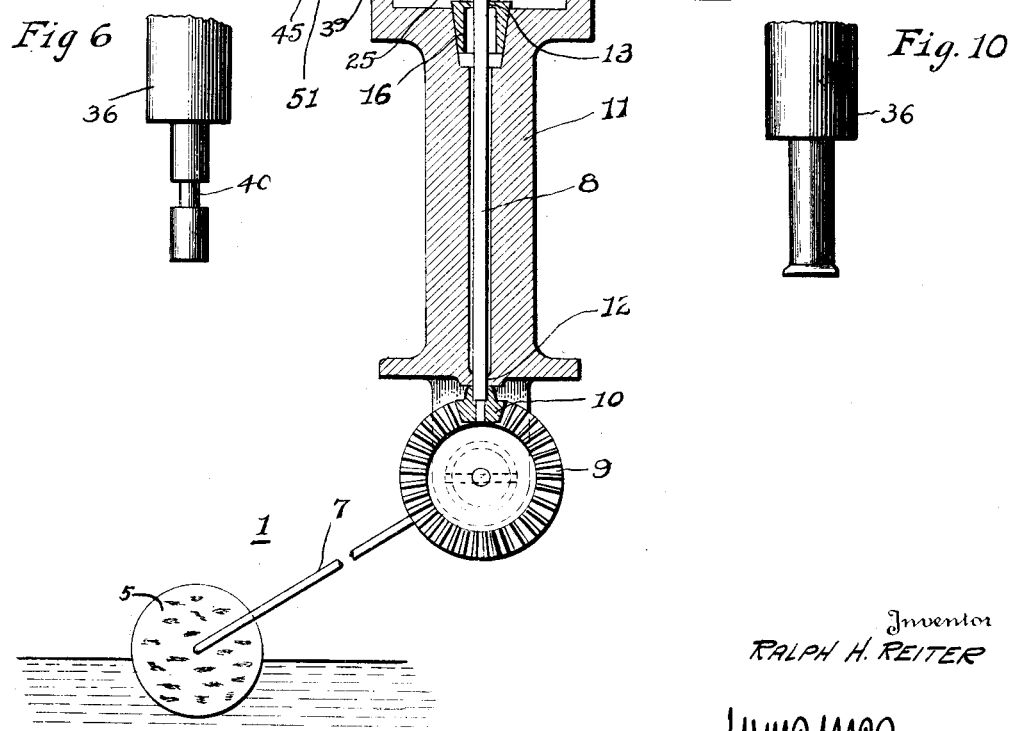
Inventor
RALPH H. REITER
By Wm C. McCoy.
Attorney

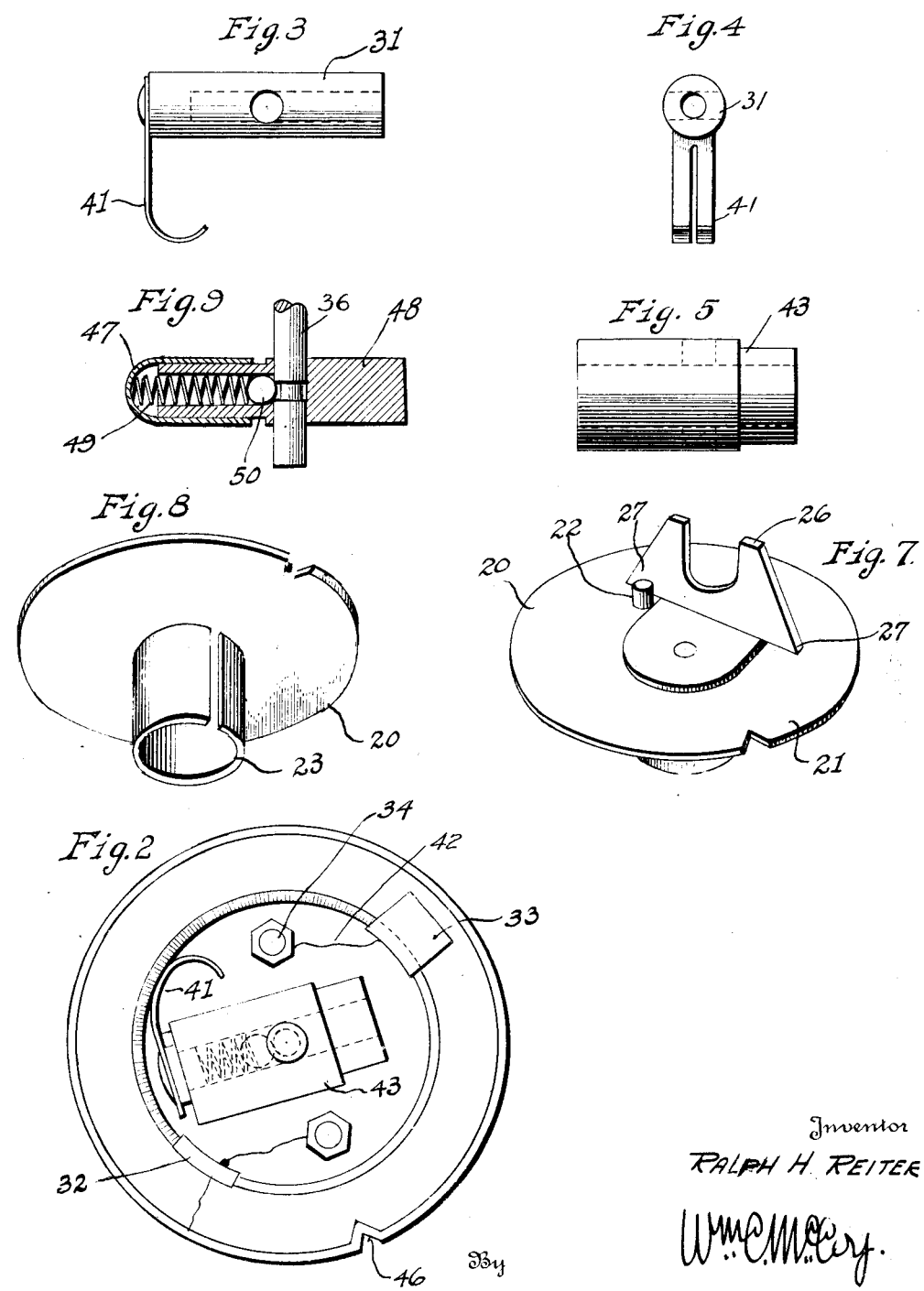

Patented Sept. 2, 1930

1,774,814

UNITED STATES PATENT OFFICE

RALPH H. REITER, OF AKRON, OHIO, ASSIGNOR TO THE CLEVELAND TRUST COMPANY, OF CLEVELAND, OHIO, A CORPORATION OF OHIO

LIQUID-LEVEL-OPERATED RHEOSTAT

Application filed April 7, 1924. Serial No. 704,595.

My invention relates to instruments for use in indicating systems, and it particularly contemplates an improved form of rheostat that is adapted to be actuated in accordance with the quantity of fuel in the fuel tank of an automobile, for use in conjunction with an electrical indicating gauge mounted on the dash-board of an automobile.

The various objects and advantages to be derived from practicing my invention will be apparent from a perusal of the accompanying specification and drawings in which:

Figure 1 is a cross sectional assembly view of a rheostat constructed in accordance with my invention and diagrammatically illustrated as forming a part of an indicating gauge system.

Figure 2 is a plan view of the portion of the instrument that contains the resistance element.

Figure 3 is a top plan view of the contact arm of the rheostat.

Figure 4 is a side elevational view of the contact arm shown in Figure 3.

Figure 5 is a side elevational view of an insulating sleeve that is used in conjunction with the contact arm.

Figure 6 is a side view of the pivot pin on which the contact arm is mounted.

Figure 7 is a perspective view, taken from above, of a guard plate that is interposed between the actuating mechanism and the rheostat.

Figure 8 is a perspective view of the under side of the guard plate shown in Figure 7.

Figure 9 is a cross sectional view of a modified form of contact arm that may be used in my rheostat; and Figure 10 is a modification of the pivotal mounting used for supporting the contact arm.

The fuel indicating system with which my device is used preferably consists of a float mechanism 1 that actuates a rheostat mechanism 2 in accordance with the level of gasolene contained in the fuel tank of an automobile, and an indicating gauge 3 that is preferably mounted on the dash-board of an automobile to indicate the position of the float mechanism and, therefore, the level of gasolene to the driver of the automobile. Power for operating the gauge is preferably derived from an automobile storage battery 4.

The float mechanism consists of a buoyant body 5, preferably a shellacked cork, that floats on the surface of the fuel in the tank 6 of the automobile. The cork float is mounted at one extremity of an arm 7, the movement of which operates a vertical shaft 8 through the gear set 9 and 10. A bracket 11 pivotally supports the float arm 7 and provides bearing supports 12 and 13 for the vertical shaft 8. The bracket 11 is rigidly connected to the fuel tank 6 by means of a collar 14 in accordance with conventional practice.

The bracket 11 has a bearing portion 12 that snugly fits the shaft 10 and provides the first seal against the leakage of gasolene fumes from the fuel tank to the rheostat. The top bearing 13 is formed of a brass bushing that is pressed into the bracket 11. A sleeve 16 that is rigidly mounted on the upper end of the vertical shaft 10 provides a substantially gas tight bearing at the top of the shaft. The upper end 17 of the shaft 8 is bent at right angles to the remainder of the shaft to provide a crank that partly serves to transmit the shaft motion to the rheostat.

The part of the mechanism thus far described is referred to herein as the float mechanism 1 to distinguish it from the remainder of the apparatus. The most essential feature of this mechanism is to provide an effective seal for preventing the passage of gasolene vapors along the shaft 10 to the rheostat chamber.

A guard plate 20 is interposed between the rheostat unit 2 and the float mechanism 1. This plate is shown in enlarged perspective in Figures 7 and 8. It consists of a round disc having an assembly notch 21 that is positioned oppositely to a stop 22. A motion transmitting unit 23 that embodies a cylindrical portion 24 having a slot 25 therein that is of sufficient size to fit over the bent portion 17 of the float mechanism, is mounted in the disc or guard plate 20 for turning movement with relation thereto. The cylindrical portion 24 is rotatably mounted in the disc 20 and is soldered into the yoke 26 that has a U-shaped saddle adapted to fit over and operate the contact arm of the rheostat, and a pair of shoulders 27 that respectively engage the stop 22 for each direction of movement. The parts 26 and 24 are rigidly soldered together and both are pivotally mounted on the plate 20.

The rheostat unit 2 comprises a case 28 of molded insulating material and a resistance wire 29 that is helically wound about a strip of fiber 30 and then bent into cylindrical form and inserted into the molded case 28. One end of the resistance element is grounded upon the guard plate 20 and also connected to a contact member 31 through a copper band 32. A second copper band 33 forms a connection to terminal post 34 for the other terminal of the resistance wire 29. A conducting cable 35 extends from the rheostate to the indicating instrument 3 that is mounted on the dash-board of the automobile.

The resistance wire 29 is preferably enameled wire that has the enamel removed over a central interior portion on which the contact member 31 operates.

In order to remove all possible fire hazard, a short length of fuse wire 42 is interposed between the energized terminal 33 of the resistance element and the contact terminal 34.

The contact member 31 consists of a body of conducting material that is pivotally swung from a terminal member 36 that is molded into the casing 28.

The contact member 31 has a cylindrical spring pocket formed therein for the reception of a spring 38 that holds a ball 39 in resilient engagement with the shaft of the terminal member 36. The shaft may, if desired, be provided with a groove 40 as shown in Fig. 6 or the end of the shaft may merely be enlarged as indicated in Fig. 10 to prevent dislodgment of the contact arm from the shaft.

The ball and spring arrangement just described serves to pivotally mount the contact arm in such manner that a wiping contact is obtained at the pivot of the arm, and also at the point where the wiping contact spring 41, that is carried by the contact arm, rubs the resistance wire. This insures an electrical connection at all times with a minimum of rotational friction.

A sleeve 43, of insulating material is mounted on the contact arm 31 to insulate it from the motion transmitting unit 23 that is rotatably mounted in the guard plate 20. The end of the insulating sleeve that is received in the yoke 26 is of reduced size to prevent improper assembly of the unit. The sleeve is held in place on the contact arm by the shaft of the terminal member 36 that extends through a hole formed in the insulating sleeve and the contact arm 31.

A metal collar 44 is either vulcanized to or slipped over the flange at the base of the case 28. This sleeve has an assembly notch 45 that engages a corresponding notch 46 in the case 28 and the notch in the guard plate 20 to insure proper assembly of the parts.

A modified form of contact arm which is shown in Fig. 9 comprises a contact making sleeve 47 that loosely telescopes over the conducting arm 48 and that is held in resilient engagement with the resistance element by means of the spring 49 and ball 50 that also performs the functions of the corresponding parts shown in Fig. 1.

The indicating instrument 3 is a voltage compensated instrument that is energized from the battery 4 which provides electrical energy for the system. Any preferred form of voltage compensated indicating instrument may be used with my rheostat.

In supplying my instrument to the trade, I have found that the various sizes and shapes of gasolene tanks, for different makes of automobiles, demand different lengths and adjustments of the float arm 7 in order to obtain the proper "empty" and "full" readings on the indicator scale. In order to avoid the necessity of supplying a complete line of equipment to every dealer for all makes of automobiles, I construct the float mechanism 1 as one unit, the rheostat assembled with the conducting cable, guard plate 20, and collar 44 as a second unit, and the instrument 3 as a third unit. The rheostat unit and the indicating instrument are interchangeable for all makes of automobiles whereas the float mechanism is modified to meet the demands of each type of automobile and adjusted for one particular make of automobile.

The rheostat unit 2 is held in its assembled condition by a drop of solder 51 that unites the guard plate 20 and collar 44 and that also serves to effectively ground one terminal of the resistance unit to the tank. This terminal is electrically connected to the contact terminal 33 that is also connected to the metal armour 52 of the cable.

It was also found during the construction of this instrument that if a cylindrical float 5 was used (usually a piece of shellacked cork) the difference in the effective length of lever arm of the float, if mounted concentrically of the arm 7, gave very material errors in the reading of the instrument since, when the tank is nearly empty, the outer end of the cork would furnish the buoyancy, thus greatly reducing the effective length of the float arm. By connecting the cork so that its axis of buoyancy intercepts the operating arm 7 at only one point for all positions of the arm, this error was avoided.

The contact element 41 is made flexible and has the contacting portion off-set from the arm 31 in order that the contact portion may more readily be dragged around the inner cylindrical contacting surface of the resistance element 29. This off-set relation of the supporting arm and the contact portion of the element 41 prevents binding of the contact portion with the cylindrical surface of the resistance element which is a common fault with contacting devices adapted to travel around the inside of a cylindrical resistance element. This materially reduces the possibilities of binding in the device. In order to most effectively operate, the follower 41 should contact with the surface of the resistance wire at a point 30 degrees to 90 degrees from the axis of the contact arm measured from the pivotal center of the arm.

Although I have shown and described only a single major form of my apparatus, it is obviously capable of many modifications and I desire, therefore, that only such limitations shall be imposed as are set forth in the accompanying claims.

What I claim is:

1. A rheostat mechanism comprising, in combination, a resistance unit, a rotatable contact arm actuable to a plurality of positions along said resistance unit, a rotatable operating member disposed in axial alignment with the axis of rotation of said contact arm but supported independently of and axially spaced from said contact arm, and means for actuating said contact arm from said operating member.

2. A rheostat mechanism comprising, in combination, a resistance unit of substantially cylindrical form having an internal substantially cylindrical contacting surface, a contact arm rotatable about the axis of said internal cylindrical surface and cooperable with said surface, a rotatable operating member disposed in axial alignment with the axis of rotation of said contact arm but supported independently of and axially spaced from said contact arm, and means for actuating said contact arm from said operating member.

3. A rheostat mechanism comprising a resistance unit having a cylindrical contacting surface, a contact terminal post, a movable contact member pivotally mounted on said contact terminal post substantially concentrically of said contacting surface and electrically connected to said post, operating mechanism having bearing supports independent of the contcat member substantially concentrically of said contacting surface, and a concentrically pivotally mounted intermediate member actuated from said operating mechanism and adapated to mechanically engage and actuate said contact member, and electrical insulating material interposed between said contact arm and said intermediate member.

4. A rheostat comprising a resistance element having a cylindrical contact surface, a contact terminal, a contact arm pivotally mounted on said contact terminal and in electrical contact therewith, an insulating sleeve mounted on said contact arm, and operating mechanism embodying a saddle of U-shape adapted to loosely embrace said insulating sleeve for operating said contact arm.

5. A rheostat comprising a resistance element having a cylindrical contact surface, a contact terminal mounted concentrically with respect to said surface and terminating in a relatively small shaft having a groove near one end thereof, a contact arm pivotally mounted on said shaft, a ball member adapted to hold said contact arm on said shaft, and means for resiliently holding the ball member in contact with said shaft.

6. A rheostat mechanism for use on automobiles comprising an operating mechanism, a resistance element, a contact member adapted to be actuated over the contact surface of said element, a supporting housing for said resistance element and said contact member completely enclosing them, a motion transmitting device rotatably mounted in the wall of said housing independently of the contact member and operating mechanism and adapted to transmit movement from the operating mechanism to the contact member, and means for interlocking said operating mechanism and rheostat container in definite relation to prevent improper assembly thereof.

7. In a housed rheostat mechanism, a cylindrical resistance element formed of closely wound turns of enamel insulated resistance wire, wound transversely on an elongated arcuate transversely flat core of flexible material and of substantially uniform internal diameter and having insulation removed from the internal face thereof to provide a cylindrical contact face having its elements substantially parallel to the elements of the flat core, and a contact element motivated by force applied externally of its pivot on the free end of the contact arm and swingable over the contact face of said resistance element, and disposed completely within the housing and means for actuating said contact arm.

In witness whereof, I have hereunto signed my name.

RALPH H. REITER.